US006862281B1

(12) United States Patent
Chandrasekaran

(10) Patent No.: US 6,862,281 B1
(45) Date of Patent: Mar. 1, 2005

(54) L4 LOOKUP IMPLEMENTATION USING EFFICIENT CAM ORGANIZATION

(75) Inventor: Varagur V. Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 09/854,013

(22) Filed: May 10, 2001

(51) Int. Cl.$^7$ ............................................. H04L 12/56
(52) U.S. Cl. ..................................... 370/392; 711/108
(58) Field of Search ............................ 370/351–4, 389, 370/392–3, 400–403, 404, 469, 471, 474, 475; 711/216, 108

(56) References Cited

U.S. PATENT DOCUMENTS

| 3,648,254 | A | 3/1972 | Beausoleil |
|---|---|---|---|
| 4,296,475 | A | 10/1981 | Nederlof et al. |
| 4,791,606 | A | 12/1988 | Threewitt et al. |
| 4,996,666 | A | 2/1991 | Duluk, Jr. |
| 5,088,032 | A | 2/1992 | Bosack |
| 5,319,763 | A | 6/1994 | Ho et al. |
| 5,383,146 | A | 1/1995 | Threewitt |
| 5,440,715 | A | 8/1995 | Wyland |
| 5,450,351 | A | 9/1995 | Heddes |
| 5,481,540 | A | 1/1996 | Huang |
| 5,515,370 | A | 5/1996 | Rau |
| 5,740,171 | A | 4/1998 | Mazzola et al. |
| 5,841,874 | A | 11/1998 | Kempke et al. |
| 5,842,040 | A | 11/1998 | Hughes et al. |
| 5,898,689 | A | 4/1999 | Kumar et al. |
| 5,920,886 | A | 7/1999 | Feldmeier |
| 5,930,359 | A | 7/1999 | Kempke et al. |
| 5,956,336 | A | 9/1999 | Loschke et al. |
| 5,978,885 | A | 11/1999 | Clark, II |
| 6,000,008 | A | 12/1999 | Simcoe |
| 6,041,389 | A | 3/2000 | Rao |
| 6,047,369 | A | 4/2000 | Colwell et al. |
| 6,061,368 | A | 5/2000 | Hitzelberger |
| 6,069,573 | A | 5/2000 | Clark, II et al. |
| 6,081,440 | A | 6/2000 | Washburn et al. |

(List continued on next page.)

OTHER PUBLICATIONS

Donald R. Morrison, "PATRICIA—Practical Algorithm to Retrieve Information Coded in Alphanumeric," Journal of the ACM, Oct. 1968, pp. 514–534, vol. 15, No. 4.

(List continued on next page.)

Primary Examiner—David Vincent
(74) Attorney, Agent, or Firm—The Law Offices of Kirk D. Williams

(57) ABSTRACT

A method of segmenting Layer 4 packet routing lookups into multiple levels for sequential search in multiple tables provided in a specially organized memory device, such as a content addressable memory (CAM). Using a sequence of limited-width keys, a single CAM (or length-cascaded bank of CAMs) can be tuned to provided faster and more efficient use of limited CAM space. Lookups used to process continuous streams of packets (such as those in the Internet Protocol [IP] format) can be performed with the present invention in either one-packet-at-a-time sequential order or in a pipelined fashion. Packet streams arriving on multiple ports of the switch device can also take advantage of time division multiplexing to employ a single search engine embodying the present invention.

35 Claims, 4 Drawing Sheets

U.S. PATENT DOCUMENTS

| | | | |
|---|---|---|---|
| 6,091,725 A | 7/2000 | Cheriton et al. | |
| 6,097,724 A | 8/2000 | Kartalopoulos | |
| 6,134,135 A | 10/2000 | Andersson | |
| 6,137,707 A | 10/2000 | Srinivasan et al. | |
| 6,141,738 A | 10/2000 | Munter et al. | |
| 6,148,364 A | 11/2000 | Srinivasan et al. | |
| 6,154,384 A | 11/2000 | Nataraj et al. | |
| 6,175,513 B1 | 1/2001 | Khanna | |
| 6,181,698 B1 | 1/2001 | Hariguchi | |
| 6,199,140 B1 | 3/2001 | Srinivasan et al. | |
| 6,236,658 B1 | 5/2001 | Essbaum et al. | |
| 6,237,061 B1 | 5/2001 | Srinivasan et al. | |
| 6,240,003 B1 | 5/2001 | McElroy | |
| 6,243,667 B1 | 6/2001 | Kerr et al. | |
| 6,246,601 B1 | 6/2001 | Pereira | |
| 6,295,576 B1 | 9/2001 | Ogura et al. | |
| 6,307,855 B1 | 10/2001 | Hariguchi | |
| 6,389,468 B1 * | 5/2002 | Muller et al. | 709/226 |
| 6,453,360 B1 * | 9/2002 | Muller et al. | 709/250 |
| 6,480,489 B1 * | 11/2002 | Muller et al. | 370/389 |
| 6,483,804 B1 * | 11/2002 | Muller et al. | 370/230 |
| 6,650,640 B1 * | 11/2003 | Muller et al. | 370/392 |
| 6,781,990 B1 * | 8/2004 | Puri et al. | 370/392 |

OTHER PUBLICATIONS

Waldvogel et al., "Scalable High Speed IP Routing Lookups," Proc. SIGCOMM '97, pp. 25–36, 1997, ACM.

Jon P. Wade and Charles G. Sodini, "A Ternary Content Addressable Search Engine," IEEE Journal of Solid–State Circuits, vol. 24, No. 4, Aug. 1989, pp. 1003–1013.

Teuvo Kohonen, Content–Addressable Memories, 1987, pp. 128–129 and 142–144, Springer–Verlang, New York.

Brian Dipert, ed., "Special–purpose SRAMs Smooth the Ride," EDN, Jun. 24, 1999, pp. 93–104.

"Extending the LANCAM Comparand," Application Brief AB–N3, Rev. 1.0a Draft, Music Semiconductors, Milpitas, CA, Sep. 30, 1998, 4 pages.

"Advantages of CAM in ASIC–Based Network Address Processing," Application Brief AB–N11, Rev. 1.2a Draft, Music Semiconductors, Milpitas, CA, Sep. 30, 1998, 4 pages.

"Virtual Memory Applications of the MU9C1480A LAN-CAM," Application Note AN–N3, Rev. 1a, Music Semiconductors, Milpitas, CA, Sep. 30, 1998, 12 pages.

"Using the MU9C1965A LANCAM MP for Data Wider than 128 Bits," Application Note AN–N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN–N25, Rev. 0a, Music Semiconductors, Milpitas, CA, Oct. 1, 1998, 16 pages.

"Using MUSIC Devices and RCPs for IP Flow Recognition," Application Note AN–N27, Rev. 0, Music Semiconductors, Milpitas, CA, Oct. 21, 1998, 20 pages.

"Wide Ternary Searches Using Music CAMs and RCPs," Application Note AN–N31, Rev. 0, Music Semiconductors, Milpitas, CA, Apr. 13, 1999, 8 pages.

* cited by examiner

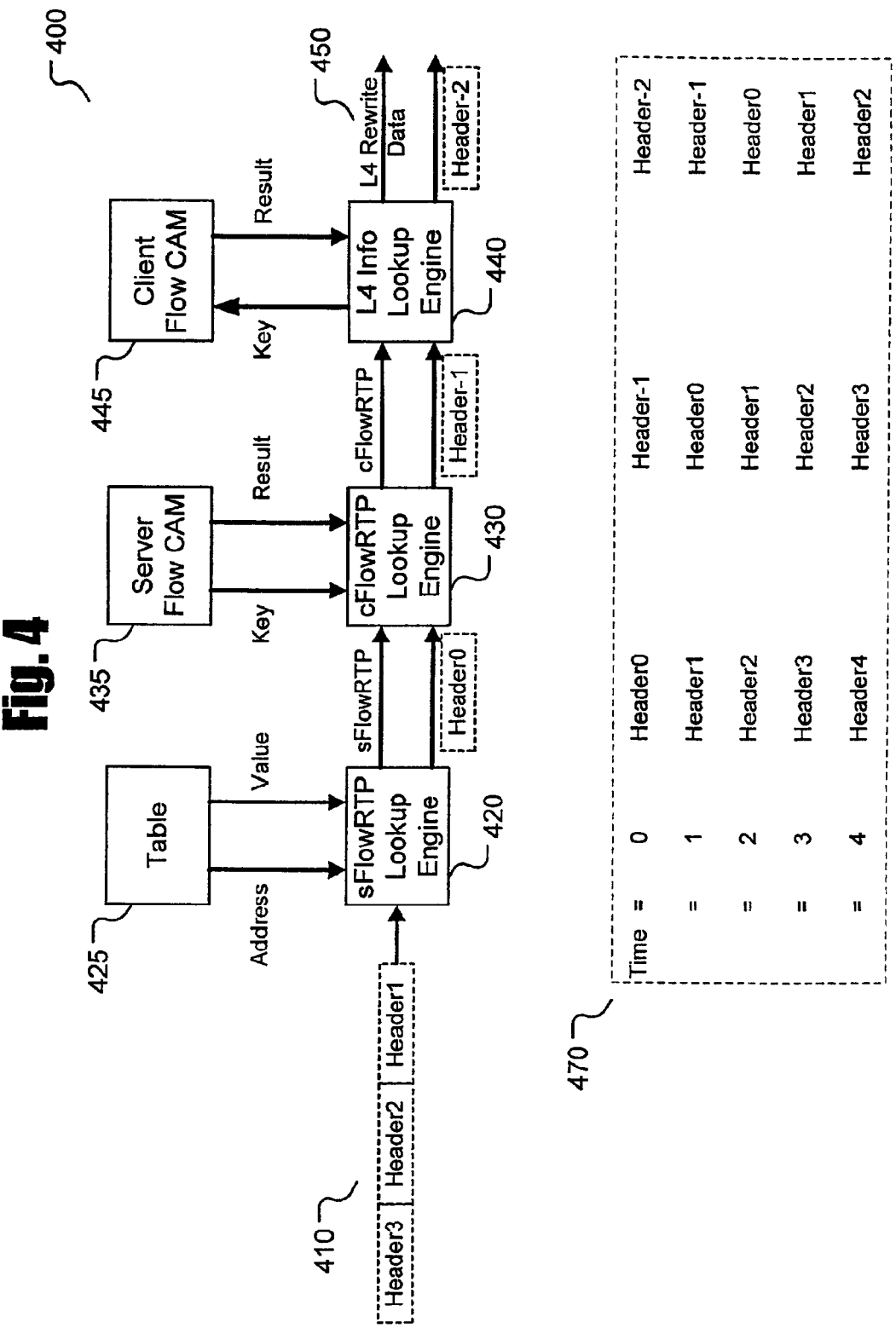

L4 LOOKUP IMPLEMENTATION USING EFFICIENT CAM ORGANIZATION

BACKGROUND OF THE INVENTION

1. Field of the Invention

The present invention relates to data networking, in particular routing and switching systems.

2. Description Of The Related Art

Many types of routing or switching systems are well known in the data communications arts. In the most abstract sense, these systems consist of the elements noted in FIG. 1. A packet generated in or originating from a source network 110 arrives at a switch device 120. The packet is switched based on its header information to a destination network 130. Switch 120 consists, in its most general form, of a destination lookup device 121, a switch fabric or switch mechanism 123, and a rewrite device 127.

Lookup device 121 examines the source packet header (as found, for example, in Internet Protocol [IP] packets) for information indicating the next device that is to receive and/or process the packet. That next device information is extracted, by means also well known in the art, and typically used to access some manner of a lookup table or tree structure to determine the appropriate routing information. The routing information is then used to forward the packet through switch fabric 123 and out to the destination network 130. Such routing decisions can be made at Layer 3 (L3) or Layer 4 (L4) of the well-known OSI reference model.

Switch fabric 123 is conventionally provided by any of a number of well-known blocking or non-blocking switching systems used in the art and is not further discussed herein.

Rewrite device 127, which is often (but not always) included in switch 120, physically changes the packet to put new destination and source information into the packet header immediately prior to sending the packet out to the destination network. In some cases, rewrite device 127 might also do a secondary lookup to determine other routing information to help speed the packet on its way or to provide packet multicast. As is well-known in the art, multicasting (among other features) can also be implemented in switching fabric 123.

FIG. 1 is a highly simplified version of common switches and routers in use today. Additional elements, such as buffering and queuing systems, statistics collection, advanced access control and other protocol-dependent mechanisms have been omitted for clarity.

Lookup device 121, in particular, presents a number of interesting opportunities for optimization of the lookup function. Optimization is considered a long-felt need in the switching and routing industry because of the continuing push for higher switch throughput and greater price-performance improvements.

As noted above, the lookup function essentially consists of extracting certain elements of the packet header and forming a tuple of those elements (by concatenation, for example) to use as a lookup key. This lookup key is then presented to a search engine, which is known to take on many forms in the art. The search engine performs its search looking for matches to the key and returning the information corresponding to that key.

One method of doing such a lookup known in the art is to use a content addressable memory (CAM) as part of the search engine. A CAM is a memory device which returns an index when presented with the key. The index is the address within the CAM where the first match of the key is found and is conventionally used as a pointer into a separate RAM containing the data to be returned from the lookup.

In performing routing and switching lookups, the key is typically a combination of the destination address of the packet and other parameters describing (for example) the source interface on which the packet was received. The return value (the index) can take on several forms, the most commonly used being a new destination address which tells the switch where to send the packet.

The operation of CAMs, and their close cousin the ternary CAM (TCAM) in the context of routing lookups are further described in M. Waldvogel, et a)., Scalable High Speed IP Routing Lookups. Proceedings of the ACM SIGCOMM'97 Conference on Applications, Technologies, Architectures, and Protocols for Computer Communication, Sep. 14–18, 1997, Cannes, France, incorporated herein by reference in its entirety.

One drawback long seen in the use of CAMs is that CAMs themselves have a finite (and often limited) allowable key width. That is, CAMs are typically built to a certain maximum key width of, for example, 32 or 64 bits. As routing information complexity increases with the addition of protocol, access control, and queuing/buffering control parameters to the lookup key, the number of bits needed in the key rapidly exceeds the maximum width of the CAM. This problem has previously been solved by performing parallel lookups in a plurality of CAMs, thus supplying an effectively wider CAM through banking. However such a solution is very expensive to implement in that CAM devices are costly in terms of price, power requirements, and thermal dissipation. Also, the time delays involved in forming multiple keys, performing lookups in multiple physical devices, and concatenating or otherwise processing multiple results can provide an unacceptable packet slowdown in high speed switching and routing systems.

Accordingly, what is needed is a way to rapidly access a single CAM or other lookup device with a very wide key and return lookup results quickly and efficiently.

SUMMARY

Presently disclosed is a method for high-speed, segmented Layer 4 (LA) lookups in a specially organized content addressable memory (CAM). The method uses a sequence of wide key lookups in a single CAM and provides faster and more efficient use of CAM space. Multiple CAM devices and/or multiple slow lookups are avoided.

Embodiments of the present invention may be used in both content addressable memories, ternary CAMs, or other variations on a content addressable memory device with equal facility.

Continuing series of lookups, such as those required to process the long streams of packets provided in modern data communications systems, can be performed in either a sequential or pipelined fashion. In a sequential lookup arrangement, each of the several lookups necessary to fully switch a packet are performed one after another. In a pipelined arrangement (in steady state), the first lookup for a new packet is performed at the same time as at least one of the subsequent lookups required for packets received immediately beforehand. In other words, in a system requiring (for example) three lookups per packet, the first lookup for packet N is performed at the same time as the second lookup for packet N-1, and the third lookup for packet N-2, where N is a packet received at a given time interval and packets N-x are packets received in the $x^{th}$ time intervals immediately proceeding packet N.

In another alternate embodiment, packet lookup sequences on packets arriving on multiple ports of a single device may be carried in a time division multiplexed (TDM) arrangement. In such an arrangement, a given window of time (e.g., window a) in the search engine is set aside for all of the lookups from port A. Time window b is set aside for processing the lookups necessary to service packets arriving on port B, and so on for each input port Each of these time windows may be sized so that all of the necessary lookups in a sequence for a single packet are performed. Alternately, each time window may be sized such that packet lookup sequences for more than one packet received at each designated port are processed within that window.

The speed and efficient packing of the data tables within the content addressable memory space is provided by the intelligent selection of packet sub-fields for lookup and the order in which the lookups are performed. Optimization is also provided by ordering the tables within the CAM in such a way that the shortest and least frequently changed tables are at the highest end of the CAM (i.e., the end of the CAM address space closest to address 0x0000 0000h) and compressed more tightly in the CAM space.

In one embodiment on the present invention, the lookup sequence for a single packet is broken into three levels. First, a 5-tuple key (consisting of the 104 bits needed for a Layer 4 lookup) is divided into three subkeys, one for each level. The first subkey consists solely of an 8-bit protocol field. This key is used to index a small, 256 entry Protocol Table within the CAM to directly read a corresponding Server Flow Table root tree pointer (sFlowRTP).

Next, the server information tuple is used as the lookup key. The 32-bit IP address and the 16 bit server port number (forming the server information tuple) are used as the key to a Server Flow Table in the CAM to look up the Client Flow Table root tree pointer (cFlowRTP). The beginning (root) of the Server Flow Table is identified by the protocol lookup: the Server Flow Table root tree pointer defines the first address of the Server Flow Table in the CAM to be used for the server information lookup.

Finally, client information lookup is performed using the 32-bit client IP address and the 16-bit client port number as the client information tuple. As before, the results of the last lookup (in this case, the Client Flow Table root tree pointer) are used to define the starting address of the particular Client Flow Table within the CAM to be used for this lookup. The results of the client information lookup define the MAC rewrite information and (optionally) any network address translation (NAT) information for Layer 4 switching of this particular packet.

Multiple Server Flow and Client Flow Tables are provided in the lookup memory space. The number of Server Flow Tables is determined by the number of discrete Server Flow Table root tree pointers listed in the Protocol Table. Similarly, the number of Client Flow Tables is defined by the number of discrete Client Flow Table root tree pointers in all of the Server Flow Tables. Both of these table spaces (i.e., the set of Server Flow Tables and the set of Client Flow Tables) are managed by system operator programming (configuration) of the search engine.

BRIEF DESCRIPTION OF THE DRAWINGS

The present disclosure may be better understood and the numerous features and advantages made apparent to those skilled in the art by referencing the accompanying drawings.

FIG. 4 is a high-level functional block diagram of a pipelined lookup sequence according to an alternate embodiment of the present invention.

The use of the same reference symbols in different drawings indicates similar or identical items.

DETAILED DESCRIPTION

Process Flow

Figure 1:
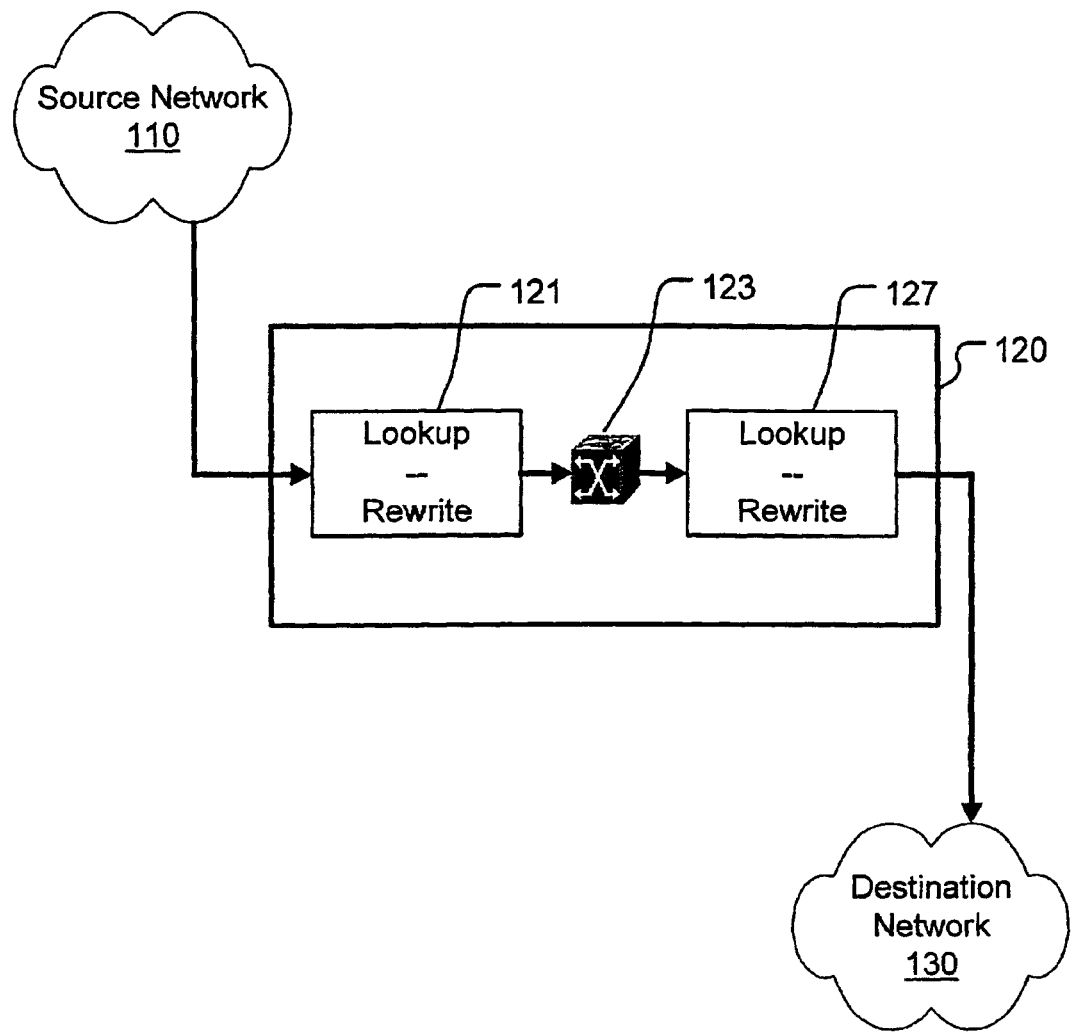
FIG. 1 is a high-level functional schematic of a router/switch system.
Figure 2:
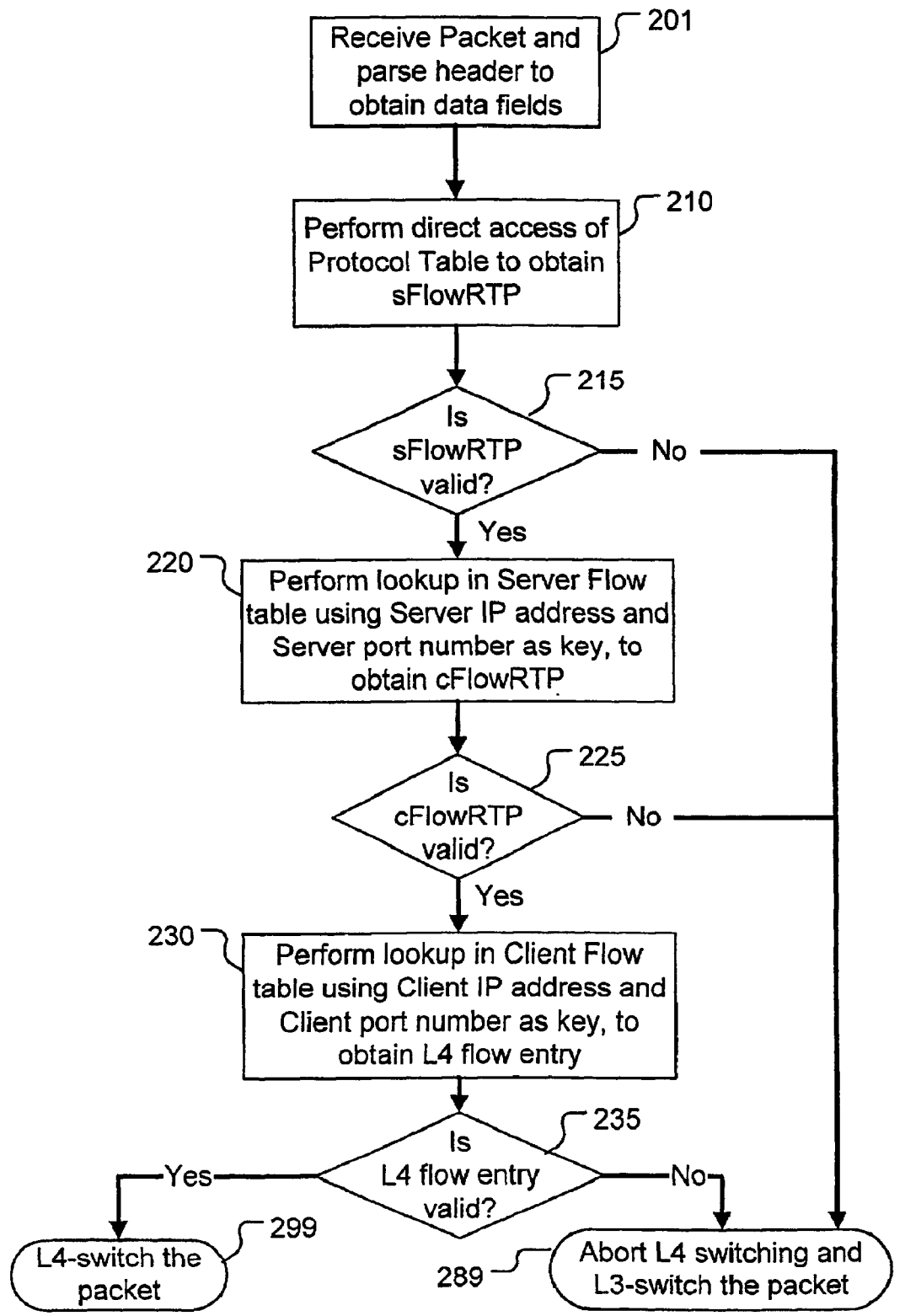
FIG. 2 is a high-level flow chart of the method according to one embodiment of the present invention.

FIG. 2 shows a flow chart of the method 200 of one embodiment of the present invention. In step 201, the packet is received and the header is read by means well known in the art. In next step 210, the 8-bit protocol field located in the Internet Protocol (IP) header is read and used to perform a direct lookup in the Protocol Table. This lookup, which determines a pointer to the root tree for a particular server flow associated with the inbound packet, returns the value of the Server Flow Table root tree pointer sFlowRTP.

Step 215 checks to determine if the sFlowRTP value is valid. This check, in one embodiment of the present invention, is nothing more than a simple "not equal to zero" test Such a test is used to determine if a valid (non-zero) sFlowRTP pointer has been returned. If there is no sFlowRTP pointer, i.e., sFlowRTP is equal to zero, Layer 4 switching is aborted and conventional Layer 3 switching is performed by means well known in the art at step 289.

If the sFlowRTP is a valid number, then step 220 performs the server information lookup using the server IP address and server port number fields from the packet header. To perform this lookup, the server IP address (a 32-bit number) and the server port number (16-bit number) are concatenated and used as the lookup key in a CAM lookup. The value returned by this lookup is the root tree pointer to the particular Client Flow Table containing the client flow routing information, designated cFlowRTP. Choosing to perform a server-only lookup helps to optimize Layer 4 switching and its associated lookups by simplifying the longest prefix match lookup problem so often seen in the art. This is so because the server IP address and server port number together (as a tuple) define a particular flow out of all the possible server flows seen by the switch. This unique definition is based on server information that does not change as often as client information, simply because the number of servers and their port information does not change as dynamically as the number of clients and the individual packet streams from individual clients. Generally speaking, the constellation of servers present in a network is relatively static. By first identifying and isolating the processing (i.e., the switching lookups) based on server flow identifying information, process 200 simplifies the switching decisions necessary to fully route the packet.

Figure 3:
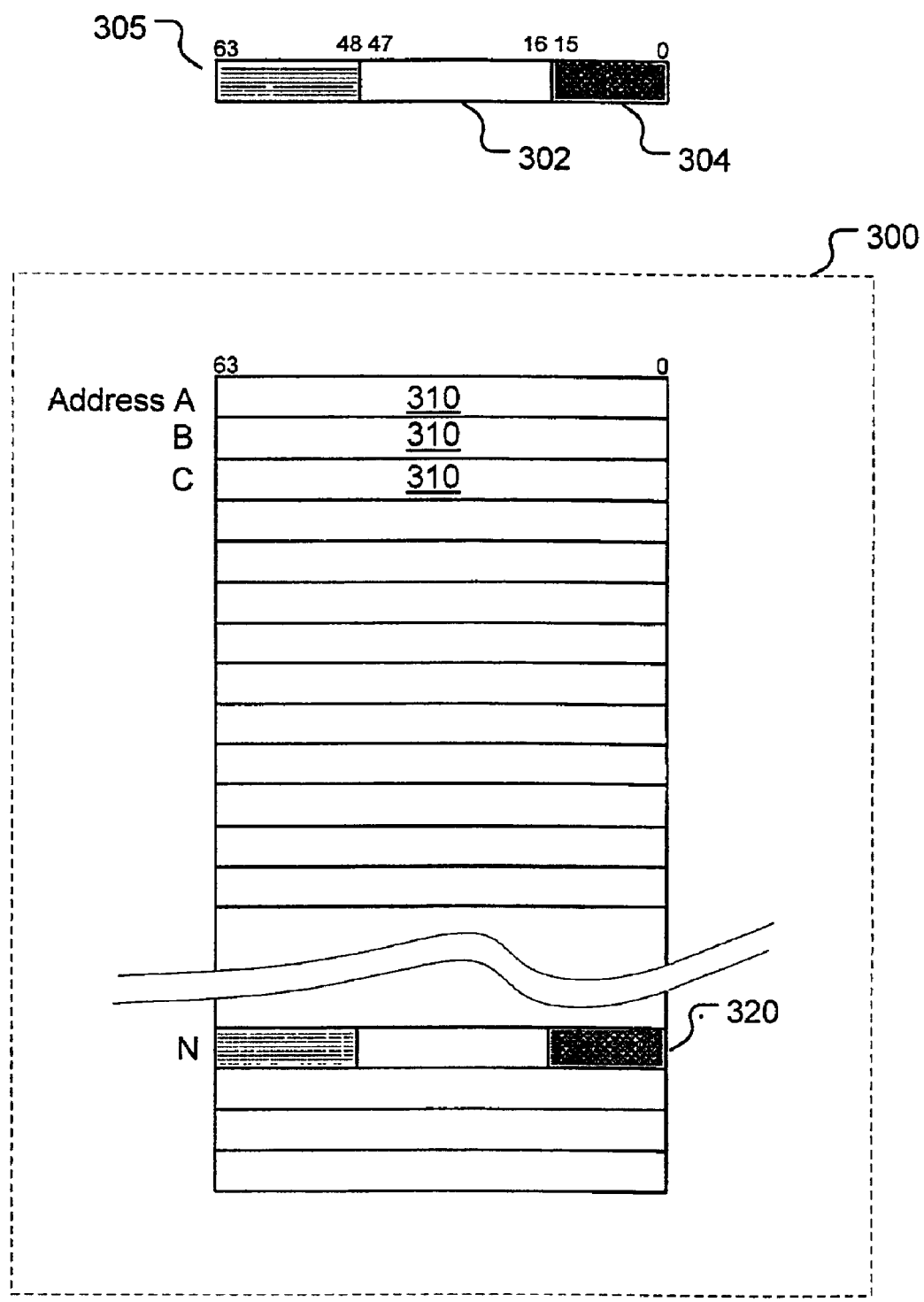
FIG. 3 is a high-level functional block diagram of an exemplary CAM according to one embodiment of the present invention.

FIG. 3 shows a high-level functional block diagram of an exemplary CAM 300, according to one embodiment of the present invention. CAM 300 is configured to perform the server information lookup of step 220 above. Lookup key 305 is formed by concatenating server IP address 302 with server port number 304. Bits [63:48] are reserved for other uses. (Although a simple concatenation in a 64-bit wide CAM is illustrated will realize that other CAM widths and/or concatenations can be used. Accordingly, the invention is not limited to any particular CAM width or concatenation scheme.)

In accordance with conventional CAM usage, lookup key 305 is bitwise ORed with all entries 310 of CAM 300.

Matching entry 320 at address "N" thus provides, in some embodiments, a pointer to a secondary RAM structure containing the corresponding cFlowRTP. In an alternate embodiment, address "N" can be used as the cFlowRTP directly.

A similarly configured CAM, either within another CAM device or a region within the same CAM and defined by selective masking (as that practice is known in the CAM arts), is used for the client information lookup described below.

Next, in step 225, cFlowRTP is tested to be certain that it is a non-null value. If cFlowRTP is equal to zero, the Layer 4 switching lookup process will abort at step 289. If, however, cFlowRTP is valid, that value is used to point to the beginning (root) of the appropriate client flow lookup table. This table is "appropriate" in the sense that it is a table constructed (by conventional means) based on the routing information identified by the network for packets from the particular server flow identified in the previous lookup step 220.

The client information lookup is then performed at step 230. Here, the client IP address and the client port number are used to determine the ultimate Layer 4 flow entry values unique to the combination of IP protocol, server flow, and client flow of the inbound packet.

In one embodiment of the present invention, final lookup step 230 returns the MAC rewrite information necessary to provide Layer 4 destination information for the packet's next hop. That information is tested in step 235 for validity. If that information is non-zero (i.e., there is a valid MAC rewrite value returned) the packet is Layer 4 switched by conventional means in step 299. If, as discussed above, the final flow entry is invalid (i.e., equal to zero) L4 switching is aborted and L3 switching is carried out in step 289.

In an alternate embodiment of the present invention, lookup step 230 also returns network address translation (NAT) information that remaps the source and/or destination address of the switched packet to comply with any one of a number of means of network address translation schemes well known in the art. In fact, since the set of client flow tables provided in the CAM can be of almost any size (limited, of course, by the size of the CAM), any number of different and/or additional data fields can be supplied by the last lookup in order to implement different Layer 4 switching and/or NAT schemes. As one of ordinary skill in the art would be well versed with different methods of L4 switching and remapping schemes, the present invention will be understood to comprise all such variations as known in the art today.

The above discussion refers to the various server flow and client flow root pointer tables simply as tables existing in CAMs. One of ordinary skill in the art will readily see, however, that a number of different table organizations are equally applicable to CAM type lookups. In particular, the well-known Patricia tree is familiar in the art as providing an even more efficient access structure for CAM type lookups. Other tree structures, themselves were all known in the art, are also usable in a CAM type lookup. For example, any of a number of the high speed IP routing lookup schemes discussed in Waldvogel, et al., (cited above) may also be used. Patricia trees are discussed in further detail in D. R. Morrison, PATRICIA —Practical Algorithm to Retrieve Information Coded in Alphanumeric, Journal of the ACM, Vol. 15, no. 4, pp. 514–534 (October 1968) and G. H. Gonnet, Handbook of Algorithms and Data Structures, pp. 109 (1984), incorporated herein by reference in their entireties.

Furthermore, the type of lookup memory used is not strictly limited to a content addressable memory. Equally usable is the well-known ternary CAM (TCAM) as well as other fast memory table lookup structures seen in the art today.

Pipelined vs. Time Sequential Lookups

While the switching lookup method 200 discussed above is presented in a simple sequential ordering, one of ordinary skill in the art will see that such a multi-step lookup function is readily adaptable to pipelined operation as well. Pipelining, as that term is known in the art, refers to the practice of performing all of the steps in a multiple step sequence at the same time, but on different work objects. In the context of packet switching, pipelining often refers to the notion of performing the various steps of switching each packet in parallel on a number of packets equal to the number of steps in the switching process. For example, in a 3-step switching lookup such as that of method 200 described above, the first packet received begins processing in the first of the three steps. The next packet received is processed in the first step (here step 210) while the first packet received is processed in the second step, step 220. The third packet received is processed in step 210 at the same time the second packet is in step 220 and the third packet is in step 230. By the time the fourth packet arrives at the pipeline, the first packet to arrive has exited the pipeline and the second packet to arrive is ready to undergo the very last step.

In some embodiments of the present invention, method 200 is carried out in a pipelined fashion on the continuous stream of packets received at the switch. In other embodiments of the present invention, each packet is handled alone and the processing/switching of the next packet received waits until all lookups are performed for the first packet received. Clearly, a pipelining sequence has extra complexities which may well be offset by the throughput improvements often realized in pipelined systems. As is presently conceived, however, the single stream, non-pipelined processing is believed to be the simplest and most effective at this time, because it can be performed at wire speed, without introducing additional packet latency, and with the simplest implementation cost.

FIG. 4 illustrates, at a high level of abstraction, the operation of a pipelined lookup apparatus 400 in schematic form. A stream of packets 410, represented by their header information Header0, Header1, Header2, Header3, etc. enter sFlowRTP Lookup Engine 420. In a pipelined system according to one embodiment of the present invention illustrated here, at time 0, packet Header0 has just been processed in sFlowRTP Lookup Engine 420. Header-1 (i.e., the header of the packet immediately preceding the Header0 packet) has just been processed in cFlowRTP Lookup Engine 430 and Header-2 has just been processed in LA Info Lookup Engine 440. Table 470 identifies which packet header gets processed in each engine (or "stage," as the pipeline elements are commonly called) after each time interval. Thus, after the next time interval (Time=1), Header1 will have been processed by sFlowRTP Lookup Engine 420, Header0 will have been processed by cFlowRTP Lookup Engine 430, and Header-1 will have been processed by L4 Info Lookup Engine 440.

The operation of each engine is as follows: in sFlowRTP Lookup Engine 420, the 8-bit protocol field is used to index Protocol Table 425, returning sFlowRTP. The sFlowRTP value (and, in some embodiments, the current header) are then passed to cFlowRTP Lookup Engine 430 in the next time interval.

The cFlowRTP Lookup Engine 430 generates its lookup key as described above and performs the lookup in Server Flow CAM 435, returning lookup result cFlowRTP. The cFlowRTP (and, in some embodiments, the current header) are then passed to L4 Info Lookup Engine 440 in the next time interval.

L4 Lookup Engine 440 forms its lookup key as described above and performs the client flow lookup in Client Flow CAM 445. The result returned is L4 Rewrite data 450, which passes out of the pipeline in the next time interval.

Time Division Multiplexing

A further alternative scheme for employing the method of the present invention involves using time division multiplexing (TDM) for switching lookups. With TDM, multiple streams of packets are processed in a time-sharing scheme. The need for a TDM scheme can arise when a switch device receives more than one stream of packet data, for instance, when it is configured to receive packet streams on multiple input ports. One well-known method of processing multiple packet streams is simply to replicate the processing equipment with a dedicated set of equipment for each input port This, however, is very expensive and results in an arithmetically increased use of resources and real estate as the number of ports grows.

It is preferable, therefore, to reduce the amount of equipment and real estate needed to perform multi-port/multi-stream packet switching by using only a single switching lookup subsystem to process packets from all ports. The method of the present invention also provides an answer to this problem. Because the system and method of the present invention can run at extremely high speeds, and because the sequenced table lookup utilizes the input port number, there is no inherent limitation to the use of the present invention in multi-port switch devices. The input port number, which is the client port number for packets received from a client or the server port number for packets received from a server, is part of the switching decision process. Thus, the only constraint on the overall process devolves to simply having enough table space to support the variety of server and client flows desired by the system operator, just as in a single port implementation.

CAM Sizing

The key factor in determining CAM size is the number of flow entries the system operator wishes to maintain in the various tables contained within the CAM. If the operator wishes to minimize CPU calls and table rewrites (which are the well-known consequences of not finding a route after a lookup), then the CAM size must necessarily grow to include as many routes as possible. If, however, the system operator (or other person responsible for configuring the router/switch system) determines a certain miss rate in the CAM tables is acceptable, then the CAM size can be reduced. Such reduction in CAM size, or more accurately perhaps, such a design optimization in CAM capacity, can be determined analytically and implemented through means well-known in the art and currently in use today.

For example, if the system operator were to determine that a miss rate of x percentage were acceptable, where x percentage implies that only 100 server flows and 10,000 client flows were required, then the CAM needs only be sized to hold the 10,100 flow tables (each sized to hold the appropriate number of entries). Note, of course, that the present invention requires space in the CAM or other lookup memory structure that actually holds three tables: the protocol lookup table, the server flow table, and the client flow table. As noted above, the protocol table is generally quite small and in one embodiment requires only 256 entries.

On the other hand, if the system operator determines that a miss rate of x/2 percent is required, then the corresponding number of server and client flow entries could approximately double. In such a scenario, CAM size must necessarily increase to include the additional entries.

It is important to note that the CAM or other lookup structure contemplated by the present invention is conceived of as a single, logical lookup structure of a fixed width. It is well known in the various arts that employ CAM and similar lookup memory structures to cascade such devices lengthwise. In a length-wise cascade, the lookup key is applied simultaneously to multiple physical CAM banks having identical width. An external priority encoder is used to resolve multiple matches from the banks in order to yield the single best match. Accordingly, the present invention is not limited to a CAM structure comprising a single physical device. Rather, the present invention may include a CAM function provided by multiple banks of physical devices in a length-cascade configuration, as such configuration is known in the art today.

Alternate Embodiments

The order in which the steps of the present invention method are performed is purely illustrative in nature. In fact, the steps can be performed in any order or in parallel, unless otherwise indicated by the present disclosure.

The method of the present invention may be performed in either hardware, software, or any combination thereof as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disk [CD] in any form, DVD, etc.). Furthermore, such software may also be in the form of a computer data signal embodied in a carrier wave, such as that found within the well-known Web pages transferred among devices connected to the Internet. Accordingly, the present invention is not limited to any particular platform unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

I claim:

1. A lookup method for use in a switch, comprising the steps of:

parsing a packet header to obtain a plurality of data fields;

selecting at least one of said plurality of data fields as a protocol identifier and using said protocol identifier to directly access a Server Flow Table start pointer (sFlowRTP);

performing a first lookup using said sFlowRTP and using one or more of said data fields as a first key to determine a Client Flow Table start pointer (cFlowRTP);

performing a second lookup using said cFlowRTP and using one or more of said data fields as a second key to obtain a flow entry; and switching said packet using said flow entry.

2. The method of claim 1, wherein said first lookup or said second lookup is performed in a Patricia tree.

3. The method of claim 1, wherein said first lookup or said second lookup utilizes a content addressable memory.

4. The method of claim 3, wherein said content addressable memory comprises a ternary content addressable memory.

5. The method of claim 1, wherein said direct access, said first lookup, and said second lookup are pipelined.

6. The method of claim 1, wherein for packets arriving at a plurality of ports, at least said selecting, said performing said first lookup, and said performing said second lookup are time division multiplexed.

7. The method of claim 1, further comprising:
validating said sFlowRTP prior to performing said first lookup;
validating said cFlowRTP prior to performing said second lookup; and
validating said flow entry prior to performing said switching.

8. A computer switching system, comprising computer instructions for:
parsing a packet header to obtain a plurality of data fields;
selecting at least one of said plurality of data fields as a protocol identifier and using said protocol identifier to directly access a Server Flow Table start pointer (sFlowRTP);
performing a first lookup using said sFlowRTP and using one or more of said data fields as a first key to determine a Client Flow Table start pointer (cFlowRTP);
performing a second lookup using said cFlowRTP and using one or more of said data fields as a second key to obtain a flow entry; and
switching said packet using said flow entry.

9. The switching system of claim 8, wherein said first lookup or said second lookup is performed in a Patricia tree.

10. The switching system of claim 8, wherein said first lookup or said second lookup utilizes a content addressable memory.

11. The switching system of claim 10, wherein said content addressable memory comprises a ternary content addressable memory.

12. The switching system of claim 8, wherein said direct access, said first lookup, and said second lookup are pipelined.

13. The switching system of claim 8, wherein for packets arriving at a plurality of ports, at least said selecting, said performing said first lookup, and said performing said second lookup are time division multiplexed.

14. The switching system of claim 8, further comprising:
validating said sFlowRTP prior to performing said first lookup;
validating said cFlowRTP prior to performing said second lookup; and
validating said flow entry prior to performing said switching.

15. A computer-readable medium storing a computer program executable by a computer, the computer program comprising computer instructions for:
parsing a packet header to obtain a plurality of data fields;
selecting at least one of said plurality of data fields as a protocol identifier and using said protocol identifier to directly access a Server Flow Table start pointer (sFlowRTP);
performing a first lookup using said sFlowRTP and using one or more of said data fields as a first key to determine a Client Flow Table start pointer (cFlowRTP);
performing a second lookup using said cFlowRTP and using one or more of said data fields as a second key to obtain a flow entry; and
switching said packet using said flow entry.

16. The computer-readable medium of claim 15, wherein said first lookup or said second lookup is performed in a Patricia tree.

17. The computer-readable medium of claim 15, wherein said first lookup or said second lookup utilizes a content addressable memory.

18. The computer-readable medium of claim 10, wherein said content addressable memory further-comprises a ternary content addressable memory.

19. The computer-readable medium of claim 15, wherein said direct access, said first lookup, and said second lookup are pipelined.

20. The computer-readable medium of claim 15, wherein for packets arriving at a plurality of ports, at least said selecting, said performing said first lookup, and said performing said second lookup are time division multiplexed.

21. The computer-readable medium of claim 15, further comprising:
validating said sFlowRTP prior to performing said first lookup;
validating said cFlowRTP prior to performing said second lookup; and
validating said flow entry prior to performing said switching.

22. A computer data signal embodied in a carrier wave, comprising computer instructions for:
parsing a packet header to obtain a plurality of data fields;
selecting at least one of said plurality of data fields as a protocol identifier and using said protocol identifier to directly access a Server Flow Table start pointer (sFlowRTP);
performing a first lookup using said sFlowRTP and using one or more of said data fields as a first key to determine a Client Flow Table start pointer (cFlowRTP);
performing a second lookup using said cFlowRTP and using one or more of said data fields as a second key to obtain a flow entry; and
switching said packet using said flow entry.

23. The computer data signal of claim 22, wherein said first lookup or said second lookup is performed in a Patricia tree.

24. The computer data signal of claim 22, wherein said first lookup or said second lookup utilizes a content addressable memory.

25. The computer data signal of claim 24, wherein said content addressable memory further comprises a ternary content addressable memory.

26. The computer data signal of claim 22, wherein said direct access, said first lookup, and said second lookup are pipelined.

27. The computer data signal of claim 22, wherein for packets arriving at a plurality of ports, at least said selecting, said performing said first lookup, and said performing said second lookup are time division multiplexed.

28. The computer data signal of claim 22, further comprising:
validating said sFlowRTP prior to performing said first lookup;
validating said cFlowRTP prior to performing said second lookup; and validating said flow entry prior to performing said switching.

29. A computer switching system comprising:

means for parsing a packet header to obtain a plurality of data fields;

means for selecting at least one of said plurality of data fields as a protocol identifier and using said protocol identifier to directly accessing a Server Flow Table start pointer (sFlowRTP);

means for performing a first lookup using said sFlowRTP and using one or more of said data fields as a first key to determine a Client Flow Table start pointer (cFlowRTP);

means for performing a second lookup using said cFlowRTP and using one or more of said data fields as a second key to obtain a flow entry; and means for switching said packet using said flow entry.

30. The method of claim 29, wherein said means for performing said first lookup or said second lookup comprise a Patricia tree.

31. The method of claim 29, wherein said means for performing said first lookup or said second lookup comprise a content addressable memory.

32. The method of claim 29, wherein said means for directly accessing and said means for performing said first lookup and said second lookup are pipelined.

33. The method of claim 29, wherein for packets arriving at a plurality of ports, at least said means for selecting, said means for performing said first lookup, and said means for performing said second lookup are time division multiplexed.

34. The method of claim 29, further comprising:

means for validating said sFlowRTP prior to performing said fist lookup;

means for validating said cFlowRTP prior to performing said second lookup; and means for validating said flow entry prior to performing said switching.

35. A lookup method for use in a switch, comprising the steps of:

parsing a packet header to obtain a plurality of data fields;

selecting at least one of said plurality of data fields as a protocol identifier;

performing a server flow lookup using said protocol identifier and one or more of said data fields to determine said Client Flow Table start pointer (cFlowRTP);

performing a second lookup using said cFlowRTP and using one or more of said data fields as a second key to obtain a flow entry; and switching said packet using said flow entry.

* * * * *

UNITED STATES PATENT AND TRADEMARK OFFICE
CERTIFICATE OF CORRECTION

PATENT NO. : 6,862,281 B1
DATED : March 1, 2005
INVENTOR(S) : Chandrasekaran

It is certified that error appears in the above-identified patent and that said Letters Patent is hereby corrected as shown below:

Column 2,
Line 13, replace "et a).," with -- et al., --.
Line 43, replace "(LA)" with -- (L4) --.

Column 3,
Line 8, replace "port Each" with -- port. Each --.
Line 32, replace "16 bit" with -- 16-bit --.

Column 4,
Line 25, replace "test Such" with -- test. Such --.

Column 6,
Line 53, replace "LA" with -- L4 --.

Column 7,
Line 21, replace "port" with -- port. --.

Column 10,
Line 11, replace "claim 10" with -- claim 17 --.
Line 53, delete "further" between "memory" and "comprises".

Column 12,
Line 8, replace "fist" with -- first --.

Signed and Sealed this

Twentieth Day of September, 2005

JON W. DUDAS
*Director of the United States Patent and Trademark Office*